No. 851,515.

PATENTED APR. 23, 1907.

T. H. HARRIS.
CASH REGISTER.
APPLICATION FILED MAR. 28, 1906.

3 SHEETS—SHEET 1.

WITNESSES

INVENTOR
Thomas H Harris.
BY
ATTORNEYS

No. 851,515. PATENTED APR. 23, 1907.
T. H. HARRIS.
CASH REGISTER.
APPLICATION FILED MAR. 28, 1906.
3 SHEETS—SHEET 2.
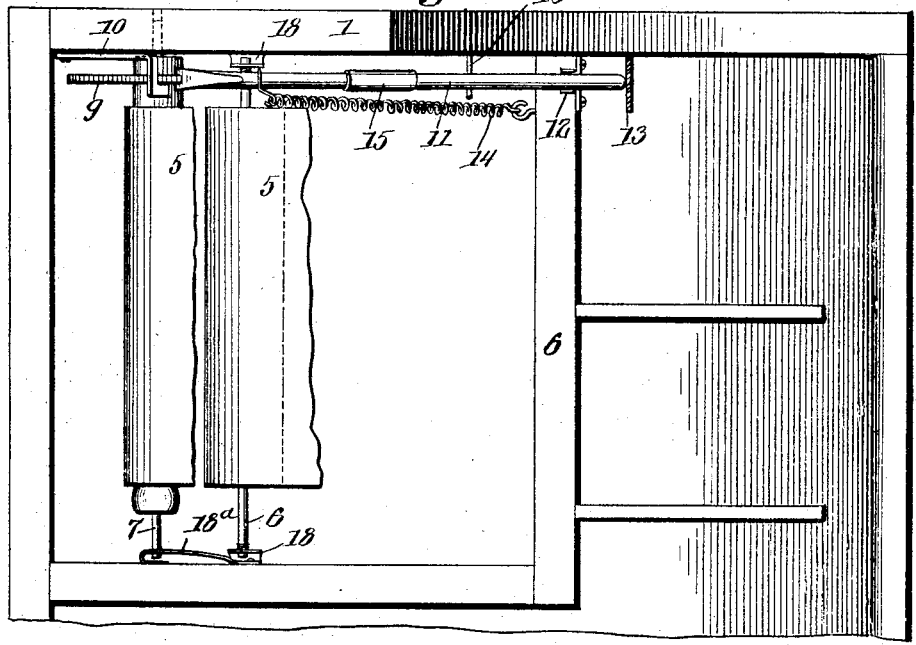
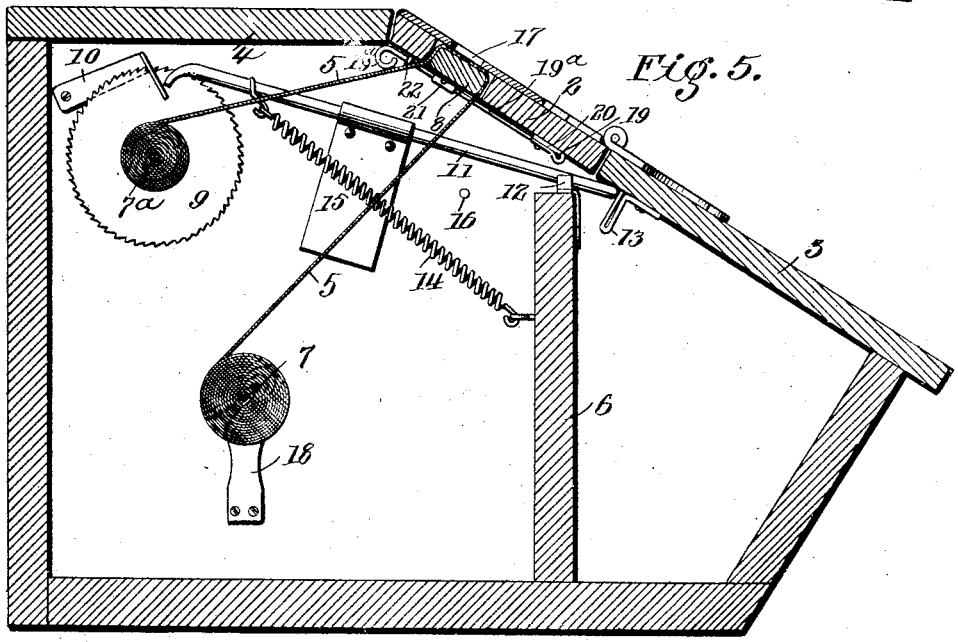
WITNESSES
INVENTOR
Thomas H. Harris.
BY
ATTORNEYS No. 851,515. PATENTED APR. 23, 1907.
T. H. HARRIS.
CASH REGISTER.
APPLICATION FILED MAR. 28, 1906.

3 SHEETS—SHEET 3.

WITNESSES
INVENTOR
Thomas H. Harris.
BY
ATTORNEYS

UNITED STATES PATENT OFFICE.

THOMAS HENRY HARRIS, OF FREDERICKSBURG, VIRGINIA, ASSIGNOR OF ONE-HALF TO THOMAS C. COLEMAN, OF WASHINGTON, DISTRICT OF COLUMBIA.

CASH-REGISTER.

No. 851,515.   Specification of Letters Patent.   Patented April 23, 1907.

Application filed March 28, 1906. Serial No. 308,456.

*To all whom it may concern:*

Be it known that I, THOMAS HENRY HARRIS, a citizen of the United States, and a resident of Fredericksburg, in the county of Spottsylvania and State of Virginia, have made certain new and useful Improvements in Cash-Registers, of which the following is a specification.

My invention is an improved apparatus for use in shops, stores, warehouses, etc., for registering sales of goods and the amount paid therefor, and also for receiving and holding the cash or vouchers deposited in payment. Each sale transaction is entered upon a movable paper strip, the entry designating the particular article or goods sold, the party who made the purchase, the amount paid by him, and the name of the clerk or salesman who effected the transaction. The cash or vouchers are deposited in compartments formed within the box or casing of the apparatus, and the hinged door or lid of the latter cannot be opened without sounding an alarm; and when the same is closed after deposit of the cash or vouchers, the strip on which the record is made is advanced, or moved, far enough to expose a new or fresh surface as required for the succeeding entry. The apparatus is thus a simple and cheap but effective substitute for the expensive cash registers which are in general use, and has marked advantages over the same in respect to furnishing a complete record of sales or other transactions.

The details of construction, arrangement, and combination of parts are as hereinafter described, the novel features being specifically indicated.

Figure 1:
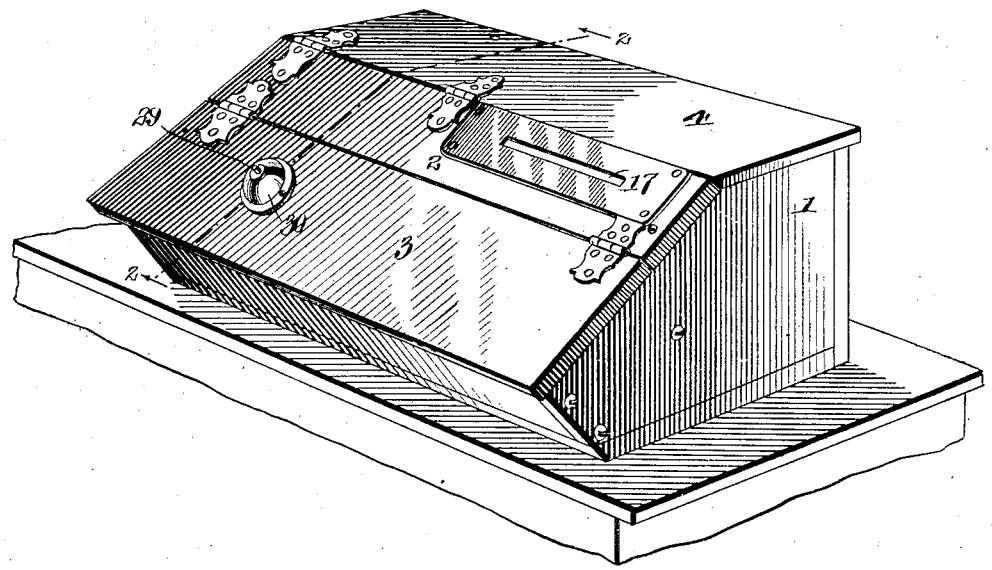
Figure 2:
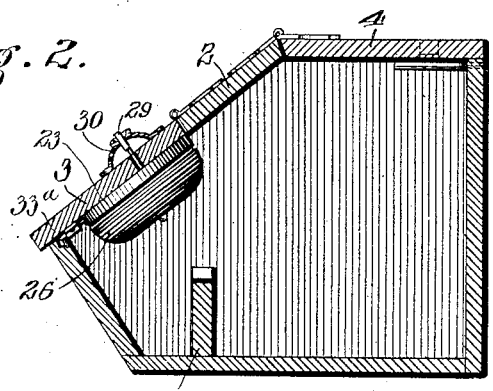
Figure 3:
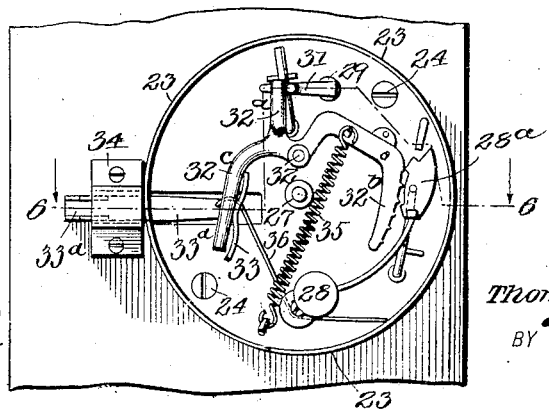
Figure 6:
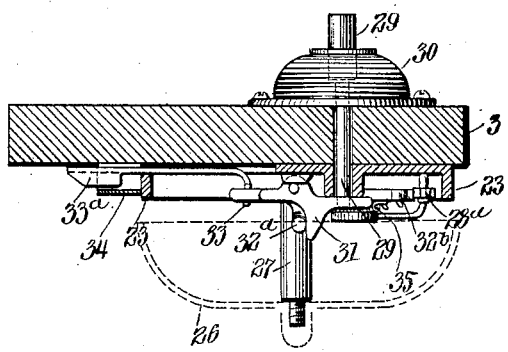
Figure 7:
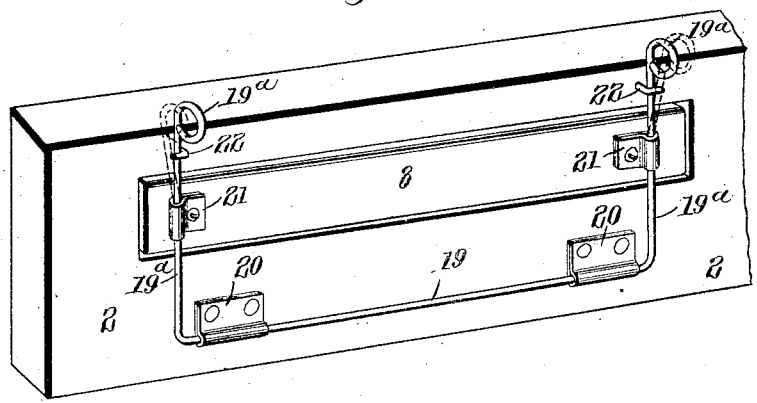
Figure 8:
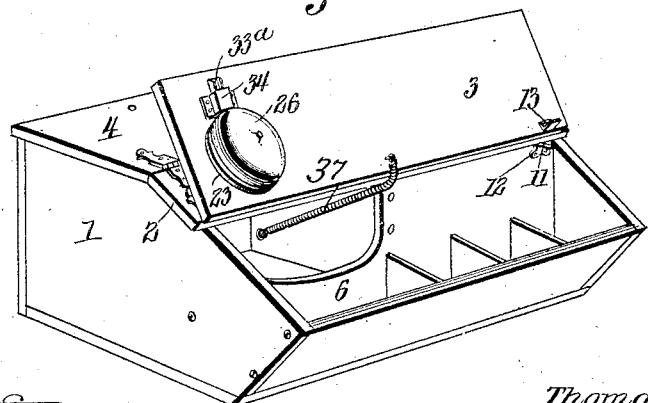

In the accompanying drawings, Figure 1 is a perspective view of my cash register, the same being shown resting upon a table or other plane surface. Fig. 2 is a transverse vertical section of the apparatus. Fig. 3 is a view of the alarm and lock for the hinged lid, the conical bell which forms part of the alarm being detached. Fig. 4 is a plan view of a portion of the apparatus, the entire top including the hinged lid being removed. Fig. 5 is an enlarged cross section of the apparatus on the line 5—5 of Fig. 4. Fig. 6 is a cross section taken on the line 6—6 of Fig. 3. Fig. 7 is a perspective view of a portion of the top of the box or casing including the movable flat bar over which the registering strip passes and upon which it is normally exposed to view. Fig. 8 is a perspective view of the register with the lower lid or cover shown open.

As indicated in Fig. 1, the box or casing of my cash register is in the form of an irregular seven-sided polygon. The ends 1 are vertical and parallel, and a narrow piece 2 is permanently secured to the inclined top portions of the ends 1. The lid 3 of the box or casing is hinged to this piece 2, and arranged below the same. The top 4 of the box also constitutes a lid which is hinged to the piece 2, and in practice secured by a lock, the key of which is retained by the proprietor of the shop or store in which the register is used. The interior of the box or casing is divided into compartments suitable for receiving vouchers, bills, or metal money of various denominations. The largest compartment contains the parts by which the movable registering strip 5 is operated. As indicated in Fig. 4, the compartment referred to is rectangular, its front side 6 forming the back of two money compartments as shown—see also Fig. 5. The ends of the paper strip 5 are attached to and wound upon shafts 7 and $7^a$. That is to say, the entire strip is first wound in a roll upon the shaft 7—see Fig. 4—and passes thence over the piece 8, which is arranged in a slot provided in the piece 2 before referred to, and passes thence to the shaft $7^a$. In practical operation, the strip is wound on the shaft 7 and on the shaft $7^a$, automatically, as will now be described. The shaft $7^a$ is provided with a ratchet wheel 9, and a pivoted pawl 10 serves to lock the same against backward rotation. A long slidable pawl 11, which is in the form of a forked bar, serves as the immediate means for rotating the ratchet 9, and thereby the winding-on shaft $7^a$. The forked end of the pawl rests upon the ratchet, and its opposite end slides in a guide 12 attached to the top of the front partition 6, and abuts a bracket or arm 13 attached to the under side of the hinged lid 3. The pawl 11 is retracted by a spiral spring 14, and a stop is provided in the form of a rectangular metal plate 15 which is secured to the middle portion of the pawl and comes in contact with a fixed pin 16—see Fig. 4—when the pawl is retracted. It is obvious that such retraction will occur when the lid 3 is raised; but when the lid is pressed down or reclosed, the arm or bracket 13 pushing against the outer end of the pawl 11, causes the latter to slide in the guide 12, and thus actuate the ratchet wheel 9 and thereby wind a portion of the paper strip 5 on the shaft 7. In other words, by opening and closing the hinged lid 3, the paper strip is always automatically operated so that a clean or fresh surface is intermittently presented through the slot formed in a metal plate 17 which is attached to the right hand end of the piece 2—see Fig. 1. The required entry is made with a pen or pencil upon that portion of the strip 5 which is exposed through the slot of the plate 17. If it is a simple transaction, it might run as follows: "Dan sold Mrs. Kate Smith, shoes $4., dry goods $7.=$11." Or it may include other sales or transactions, and, if the portion of the strip thus exposed through the slot is not sufficient, the salesman simply closes the lid 3 and then opens it again, whereby the strip having been automatically advanced, the required fresh surface is presented. The strip thus furnishes a means for recording not only sales but also any other transaction relating to the business, or even private matters which it is desirable to record. The shaft 6 is journaled in spring metal plates 18—see Figs. 4 and 5—which are secured to the opposite side walls of the compartment, and the shaft 7 is similarly supported in similar springs $18^a$. The shafts are considerably shorter than the length of the compartment, which permits them to be slid endwise, the resiliency of the journal supports 18, $18^a$, sufficing to prevent their convenient detachment. Spiral springs may be applied to the respective shafts adjacent to the spring supports 18, $18^a$, in order to prevent accidental detachment of the journals. Such detachment is obviously necessary for the purpose of attaching and detaching the paper strip before it is written upon and after it is full of entries.

It is obviously necessary that the bar 8 before referred to and over which the strip passes, shall be adapted for removal. To provide for this, and also for holding it in place when the strip 5 is in use, I provide spring fastenings whose construction and arrangement are as follows. As shown in Fig. 7—see also Fig. 5—a wire spring 19 is secured by keepers 20 attached to the piece 2, and the ends $19^a$ of said wire are bent at a right angle and pass through keepers 21 which are secured to the under side of the bar 8. The free ends of the arms $19^a$ engage hooks 22 that project adjacently from the piece 2. The spring arms $19^a$ are held normally engaged with the catches 22, and since they extend across the bar 8, they support it firmly in place; at the same time the looped free ends of the arms $19^a$ may be sprung apart, as indicated by dotted lines Fig. 7, to release them from the catches 22, when the bar 8 may be lowered, since the wire 19 is free to rotate in the keepers 20. By this means the bar 8 may be shifted from its normal position to allow convenient attachment and detachment of the paper strip.

As already indicated, the hinged top lid or cover 4 of the box or casing is to be secured by a lock, and this will not be opened save at the end of a business day or at other times when access to the strip 5 or the parts connected therewith is required. Whatever is recorded upon the strip 5 and the latter duly advanced, is thus protected and preserved in secrecy within the compartment of the box or casing in which the unwinding and winding-on shafts 6 and 7 are located.

The hinged lid 3 is latched, but the latch may be operated for releasing the lid 3 so that it may be thrown upward as indicated by dotted lines Fig. 5. It is impossible, however, to do this without sounding an alarm, the construction, location, and operation of which will now be described in connection with the latch device. Reference is made particularly to Figs. 1, 2, 3, and 6. A circular metal frame 23 is secured by screws 24 to the under side of the lid 3. A bell 26 is screwed on the central post 27, and a hammer 28 is pivoted to the frame or plate 23 and adapted to vibrate, so that, when duly operated, it strikes the edge of the bell and thus sounds an alarm. The hammer is operated by a push rod 29 that passes through a conical keeper 30, secured on the outer side of the lid 3, and through the lid itself, its inner end projecting into contact with a lever 31 which is adapted to swing vertically. A second lever having three arms is pivoted at 32— see Fig. 3—at a point between the bell post 27 and the aforesaid lever 31. One arm $32^a$ bears against a pendent arm or portion of the lever 31. Another curved arm $32^b$ having ratchet teeth engages some corresponding teeth on the enlarged pivot block $28^a$ of the hammer, and the third arm $32^c$ is in sliding engagement with a pendent flange 33, formed on or attached to the inner end of a sliding latch $33^a$. The latter slides in a space provided in the metal plate or frame 23, and also in a keeper 34, its outer end engaging a keeper inserted in the fixed front side of the box. A spiral spring 35 is attached to the notched arm $32^b$ of the three-armed lever, and thus holds all the parts, save the latch, in the required position. The latch is held normally extended or engaged with the front of the box by means of a wire spring 36, one end of which bears on the flange or plate 33 forming an attachment of the latch. It will now be understood, when a salesman has recorded on the paper strip 5 a sale or other transaction, and desires to open the box for deposit of cash, as well as to advance the strip 5 for recording another transaction, he pushes down on the sliding rod or pin 29 which tilts the lever 31 on its pivot, and thus allows the somewhat strong spiral spring 35 to swing the three-armed lever in such a manner that its teeth slide over the teeth of the block 28ᵃ constituting the hammer pivot, whereby the hammer proper 28 is rapidly vibrated and the bell thus struck a corresponding number of times; at the same time, the arm 32ᶜ of the three-armed lever being moved inward, or farther away from the edge of the circular metal plate or frame 23, it slides in contact with the flange 33 of the latch and thus retracts the same against the tension of the weaker spring 36. Thus the alarm is sounded just in advance of or simultaneously with the opening of the lid 3, so that notice is given to all concerned that the box is being opened.

A strong spiral spring 37—see Fig. 8—is attached to the under side of the lid 3 and to the back of the box, whereby it serves to forcibly close the lid when the latter is released, the bevel of the free end of the latch 33ᵃ enabling it to enter its keeper and thus resecure the lid in closed position.

What I claim is:

1. The register for the purpose specified, comprising a box having a hinged lid provided with a pendent arm within the box, a slidable pawl which engages such arm, and a ratchet wherewith the pawl engages, a device for locking the said ratchet, rotatable shafts for unwinding and winding on an inscribing strip, the winding-on shaft being automatically advanced by the sliding movement of the pawl due to closing of the lid, substantially as described.

2. In a register of the class indicated, the combination, with the box having a hinged lid, of strip unwinding and winding-on shafts, the latter provided with a ratchet, and a feed pawl applied to said ratchet and projecting into contact with the lid so that it is advanced when the lid closes, a spring for normally retracting the said pawl when the lid is opened, and a stop comprising an arm or projection of the pawl and a pin fixed in the side of the box, whereby the retraction of the pawl is arrested at the proper point, substantially as described.

3. The improved register comprising a box having a hinged lid and a portion of its fixed top provided with a removable inserted piece for supporting an inscribing strip, a recording mechanism enclosed in the box and comprising shafts for unwinding and winding-on said inscribing strip, and a ratchet-and-pawl mechanism operated by the door in closing, a spring fastening for the said inserted piece, and comprising a wire spring which is hinged to the fixed portion of the top and having arms attached to the said piece, catches fixed in the top and engaging the spring arms in such manner that when the latter are sprung apart they are freed from the catches, thus permitting the said piece to be removed for removal or application of the inscribing strip, substantially as described.

THOMAS HENRY HARRIS.

Witnesses:
    A. RANDOLPH HOWARD,
    D. GORDON GOULDMAN.